(12) United States Patent
Shiokawa et al.

(10) Patent No.: US 10,723,058 B2
(45) Date of Patent: Jul. 28, 2020

(54) LIQUID BLOW MOLDING APPARATUS AND PREFORM

(71) Applicant: DISCMA AG, Hunenberg (CH)

(72) Inventors: Mitsuru Shiokawa, Kanagawa (JP); Shinichi Tabata, Kanagawa (JP)

(73) Assignee: Discma AG, Zürich (CH)

( * ) Notice: Subject to any disclaimer, the term of this patent is extended or adjusted under 35 U.S.C. 154(b) by 238 days.

(21) Appl. No.: 15/539,970

(22) PCT Filed: Nov. 16, 2015

(86) PCT No.: PCT/JP2015/005705
§ 371 (c)(1),
(2) Date: Jun. 26, 2017

(87) PCT Pub. No.: WO2016/103563
PCT Pub. Date: Jun. 30, 2016

(65) Prior Publication Data
US 2017/0355124 A1 Dec. 14, 2017

(30) Foreign Application Priority Data
Dec. 26, 2014 (JP) .................................. 2014-265482

(51) Int. Cl.
*B29C 49/12* (2006.01)
*B29C 49/46* (2006.01)
(Continued)

(52) U.S. Cl.
CPC .............. *B29C 49/12* (2013.01); *B29C 49/46* (2013.01); *B29C 49/4823* (2013.01); *B29B 2911/14026* (2013.01); *B29B 2911/14328* (2015.05); *B29B 2911/14335* (2015.05); *B29C 49/06* (2013.01); *B29C 49/28* (2013.01); *B29C 2049/068* (2013.01); *B29C 2049/4294* (2013.01);
(Continued)

(58) Field of Classification Search
None
See application file for complete search history.

(56) References Cited

U.S. PATENT DOCUMENTS

| 9,586,713 B2 | 3/2017 | Siegl |
| 2014/0314984 A1 | 10/2014 | Lehner et al. |
| 2015/0246475 A1 | 9/2015 | Suyama et al. |

FOREIGN PATENT DOCUMENTS

| CH | 706 889 A2 | 3/2014 |
| DE | 10 2012 001229 A1 | 7/2013 |

(Continued)

*Primary Examiner* — Monica A Huson
(74) *Attorney, Agent, or Firm* — Eric J. Sosenko; Jonathan P. O'Brien; Honigman LLP

(57) ABSTRACT

A construction that prevents liquid from dripping from a nozzle and adhering to a product when the nozzle is separated from a mouth of the product after liquid-blow molding. A preform includes a mouth, a body, and a neck support portion, and is provided with a step surface on an inner peripheral face adjacent to the neck support part. A liquid blow molding apparatus includes a nozzle that is inserted in the mouth of the preform, a pressurized liquid-supply unit that supplies pressurized liquid to the nozzle, and a sealing member that is formed in a cylinder and fits on an outer peripheral face of the nozzle abuts the step surface, in an axial direction, when the nozzle is inserted in the mouth of the preform to seal the gap between the nozzle and the inner peripheral face of the preform.

20 Claims, 2 Drawing Sheets

(51) Int. Cl.
*B29C 49/48* (2006.01)
*B29C 49/28* (2006.01)
*B29C 49/06* (2006.01)
*B29C 49/42* (2006.01)
*B29K 23/00* (2006.01)
*B29K 67/00* (2006.01)
*B29L 31/00* (2006.01)

(52) U.S. Cl.
CPC .. *B29C 2049/4664* (2013.01); *B29K 2023/12* (2013.01); *B29K 2067/003* (2013.01); *B29L 2031/7158* (2013.01)

(56) References Cited

FOREIGN PATENT DOCUMENTS

| | | |
|---|---|---|
| EP | 2 801 468 A1 | 11/2014 |
| JP | 01-133714 A | 5/1989 |
| JP | 2007-030224 A | 2/2007 |
| JP | 2014-200978 A | 10/2014 |

LIQUID BLOW MOLDING APPARATUS AND PREFORM

TECHNICAL FIELD

The present invention relates to a liquid-blow molding apparatus that liquid-blow forms a resin-made preform into a container having a predetermined shape, and a resin-made preform formed into a container of a predetermined shape by the liquid-blow molding apparatus.

BACKGROUND ART

A resin-made container that contains a drink, cosmetics, a chemical, a cleaning agent, or toiletry items such as shampoo or the like can be attained by blow-molding a resin-made preform formed by injection molding or compression molding or the like. In such a case, generally, the preform used in blow-molding is equipped with a circular mouth, and a circular, closed-end body, and is constituted to be equipped with a circular and flange-shaped neck-support between the mouth and the body.

Conversely, a liquid-blow molding apparatus is known as a blow molding apparatus that blow-molds a preform by supplying a pressurized liquid into the preform, thereby liquid-blow molding the preform. The liquid-blow molding apparatus is equipped with a circular nozzle; the apparatus is constituted to insert the nozzle into the mouth of the preform, and to supply pressurized liquid into the preform through the nozzle. With this kind of liquid-blow molding apparatus, it is possible to use a liquid, such as a drink or the like, to be contained in the container as the final product, as the pressurized liquid that is supplied to the preform. For that reason, it is possible to simplify production and the construction of the blow-molding apparatus by omitting the process of filling container fluid into the container.

A nozzle in the liquid-blow molding apparatus is inserted into the mouth in the preform, and is loosely inserted with a slight gap to an inner face of the mouth to make detachment easier. For that reason, a sealing structure is disposed in the liquid-blow molding apparatus to prevent liquid supplied inside the preform through the nozzle from leaking to the outside from between the outer face of the nozzle and the inner face of the mouth.

For example, disclosed in Japanese Unexamined Patent Application Publication No. 2014-128911, hereafter "patent document 1" is a liquid-blow molding apparatus that mounts a circular sealing member to a base end of the nozzle to block the preform mouth by touching the sealing member to the open end of the mouth when the nozzle is inserted into the mouth.

SUMMARY OF THE INVENTION

However, in a construction that touches the sealing member to an open end of the mouth, as described with the conventional liquid-blow molding apparatus disclosed in patent document 1, it is possible to prevent liquid from leaking to the outside of the preform, but it is not possible to prevent liquid from invading between the outer peripheral face of the nozzle and the inner face of the mouth. For that reason, liquid adheres to the outer peripheral face of the nozzle with the liquid that is supplied. Therefore, after the liquid-blow molding process is ended, liquid adhering to the outer peripheral face of the nozzle will drip downward when the product is removed from the mold by separating the nozzle from the mouth, causing a problem of liquid or the like adhering to the product and to the mold and other parts.

The present invention solves the problem described above. An object of the present invention is to provide a liquid-blow molding apparatus and preform that prevents liquid from dripping from the nozzle and adhering to a product or the like when the nozzle is separated from a mouth after liquid-blow molding.

The liquid-blow molding apparatus is a liquid-blow molding apparatus that liquid-blow molds a resin-made preform into a container having a predetermined shape, comprising a cylindrical nozzle that is inserted into an mouth in the preform; a pressurized liquid-supply unit that supplies pressurized liquid to the nozzle inserted in the mouth; and a sealing member formed into a cylinder that fits on an outer peripheral face of the nozzle sealing the nozzle and inner peripheral face of the preform by touching from an axial direction a step surface disposed at the inner peripheral face of the preform at an end face in the axial direction, when the nozzle is inserted into the mouth.

In one aspect, it is preferable that an outer diameter of a sealing body is smaller than an inner diameter of the preform between the step surface and an open end of the mouth, in one configuration of the liquid-blow molding apparatus.

In another aspect, it is preferable that a leading end position of the nozzle and a leading end position of the sealing member substantially match in the axial direction, in one configuration of the liquid-blow molding apparatus.

The preform embodying principles of the present invention is a resin-made preform that is formed into a container having a predetermined shape by the liquid-blow molding apparatus, having a cylindrical mouth, a circular, closed-end body that is linked to the mouth, and a flange-shaped neck-support that projects toward an outside in the diameter direction to the mouth, and is disposed with a circular step surface that expands an inner diameter of the inner peripheral face from a side of the body toward a side of the mouth, at the inner peripheral face at a portion where the neck support is disposed.

It is preferable that the step surface in the preform is flat face substantially perpendicular to the axial direction of the mouth, in the configuration described above.

It is also preferable that the outer diameter of the mouth in the preform is larger than the outer diameter of the body at the portion that links to the neck support, in the configuration described above.

According to the principles of the present invention, it is possible to prevent liquid from adhering to the outer peripheral face of the nozzle when the liquid is supplied because the nozzle and inner peripheral face of the preform are sealed inside the mouth by the sealing member and step surface touching. Therefore, it is possible to prevent liquid from dripping from the nozzle and adhering to the product or the like, when the nozzle is separated after the liquid-blow molding process.

Furthermore, with the present invention, a step surface is disposed at the inner peripheral face at a portion where a neck-support for the preform is disposed. For that reason, the portion disposed with the step surface for the preform is reinforced by the neck-support, and a drop in strength of the preform is prevented by disposing the step surface. Therefore, it is possible firmly to touch the sealing member to the step surface without deforming the preform, thereby increasing sealing performance at that portion, and reliably to suppress the liquid from adhering to the outer face of the nozzle inserted into the mouth.

DETAILED DESCRIPTION

An example embodying the principles of the present invention will now be described in detail with reference to the drawings.

Figure 1:
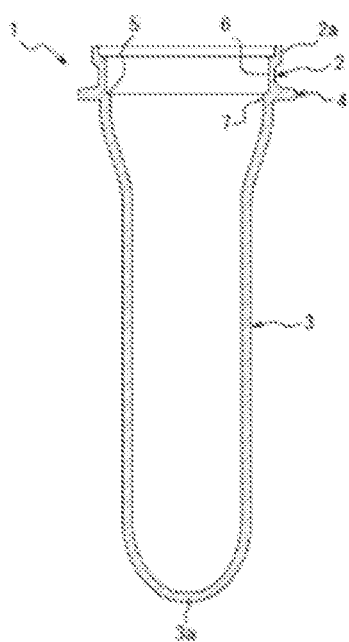
FIG. 1 is sectional view of a preform according to one embodiment incorporating the principles of the present invention.
Figure 2:
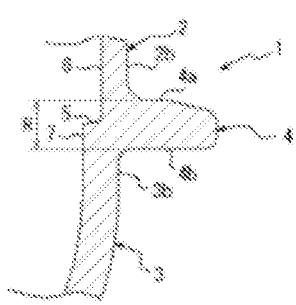
FIG. 2 is an expanded sectional view of a portion of the preform shown in FIG. 1.
Figure 3:
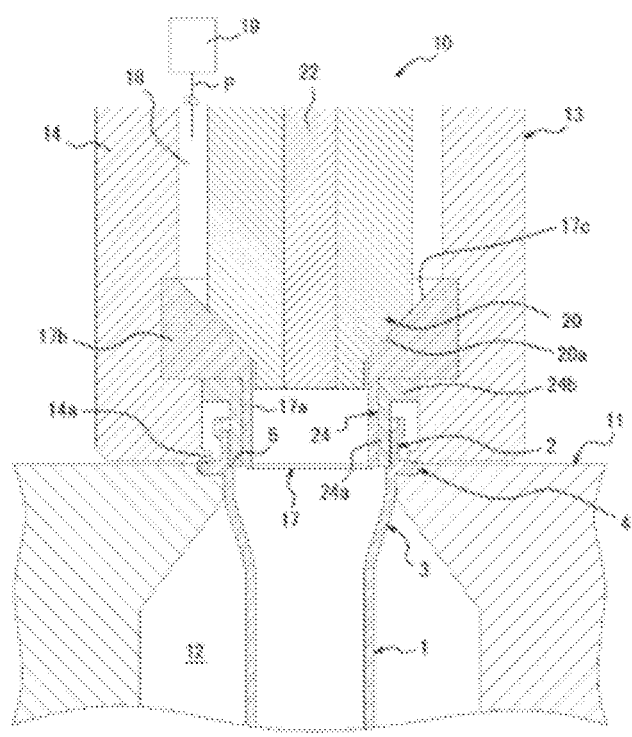
FIG. 3 is partial sectional view of a portion of a liquid-blow molding apparatus as might be employed with the preform seen in FIG. 1.
Figure 4:
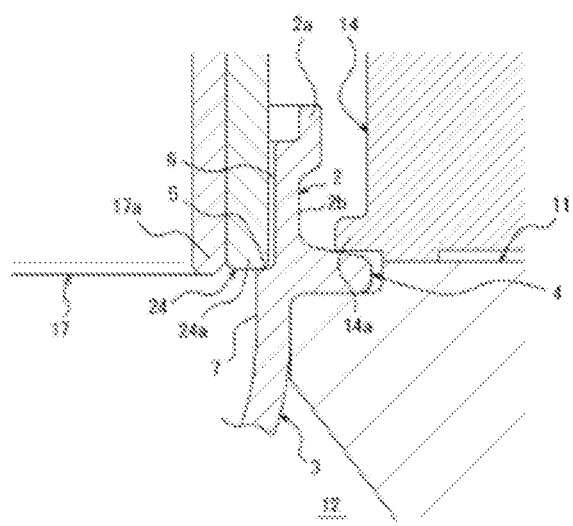
FIG. 4 is an expanded sectional view of engagement between the sealing member of the liquid-blow molding apparatus and a step surface of the preform as seen in FIG. 3.

A preform 1 embodying the principles of the present invention is shown in FIGS. 1 and 2 is formed into a container having a predetermined shape, by liquid-blow molding using a liquid-blow molding apparatus 10 as generally shown in FIG. 3, for example.

This preform 1 is made of resin, formed by a resin material that expresses stretchability by heating polypropylene (PP), polyethylene terephthalate (PET), or polyethylene (PE), for example. A nearly test tube shape, equipped with an mouth 2, a body 3, and a neck support 4, for the preform is provided by forming using means such as injection molding, compression molding, extrusion molding or the like.

Also, the preform 1 is not limited to a single-layer structure formed using only one type of resin material. It is acceptable to form an outside layer and an inside layer using different materials, and to use a laminated structure that laminates so that these do not mutually touch, or a laminated structure that disposes in an axial direction band-shape, an adhesive layer between the outside layer and the inside layer in that laminated structure. In a case of using this kind of laminated structure for the preform 1, it is possible to form a laminated separate container having a predetermined shape by liquid-blow molding the preform 1. A laminated structure of the preform 1 is not limited to that. It is also acceptable to use any laminated structure, if it is possible to constitute a laminated, separate container laminated to enable the inner layer to be able to separate to the inside of the outside layer.

The mouth 2 is a portion that is not stretched by liquid-blow molding; it is formed into a cylindrical shape. With this embodiment, a portion of an open end of the mouth 2 is constituted into an enlarged diameter portion 2a that enlarges toward the outside in a radial direction, but it is also acceptable not to constitute this enlarged diameter portion 2a.

The body 3 is the portion that is stretched by liquid-blow molding; it is formed into a closed-end tube shape coaxial to the mouth 2, and disposed integrated in line to a bottom end of the mouth 2. With this embodiment, the body 3 is formed to have a fixed diameter after a gradually reduced diameter from a portion that connects to the mouth 2, toward a bottom; a bottom 3a thereof is formed to take on a rounded shape. Also, with this embodiment, an outer diameter of the body 3 is formed into a smaller diameter than the outer diameter of the mouth 2, but it is acceptable to form the body 3 into the same diameter as the mouth 2, or into a larger diameter than the mouth 2, to correspond to a shape of the container after molding.

The neck support 4 is disposed between the mouth 2, and the body 3. This neck support 4 is formed into a flange shape, projecting radially outward from the outer surface of the mouth 2. Also, the neck support 4 is formed into an extended ring shape around the entire peripheral in the circumferential direction of the preform 1.

A step surface 5 is disposed at an inner peripheral face of the preform 1. This step surface 5 is a substantially flat face perpendicular to an axial direction of the mouth 2, and is formed into an extended ring shape around the entire peripheral in the circumferential direction of the preform 1. The step surface 5 functions as a seal surface where a sealing member touches from the axial direction when liquid-blow molding the preform 1 using a liquid-blow molding apparatus 10. It is possible reliably to touch the sealing member to the step surface 5 by constituting the step surface 5 to be a substantially flat, perpendicular face in the axial direction of the mouth 2.

Also in accordance with this embodiment, the step surface 5 may be formed slightly inclined, relative a perpendicular plane to the axial direction of the mouth 12, in a direction away from the open end of the mouth, gradually from the outside toward the inside in both an axial and radial direction. However, it is not limited to this. It is acceptable to form this into a completely perpendicular plane in the axial direction of the mouth 2, for example, or into a curved face or the like, as long as it is a form allowing contact with the sealing member.

As shown in FIG. 2, the inner diameter of the inner peripheral face 6 of the preform, which extends from the step surface 5 toward the open end of the mouth 2, is larger than the inner diameter of the inner peripheral face 7 that extends from the step surface 5 toward the body 3 of the preform 1. In this way, the inner diameter of the inner peripheral face of the preform 1 enlarges from the body 3 side toward the mouth 2 side; and the location where the inner diameter of the inner face enlarges is the step surface 5.

As shown in FIG. 2, the step surface 5 is disposed on the inner peripheral face at the location disposed adjacent to the neck support 4 of the preform 1. In other words, when looking from the axial direction, the step surface 5 is disposed, positioned at a range R between a top face 4a of the neck support 4 (which faces toward the mouth 2), and a bottom face 4b (which faces toward the body 3). In this way, by establishing the step surface 5 on the inner peripheral face at the portion where the neck-support 4 for the preform 1 is disposed, it is possible to reinforce the portion disposed with the step surface 4 for the preform 1, and to prevent a drop in strength of the preform 1 by disposing the step surface 5.

Also, the outer diameter of the outer peripheral face 2b of the mouth at the portion adjacent to the neck support 4 is wider in diameter than the diameter of the outer peripheral face 3b of the body 3 at the portion adjacent to the neck support 4. In this way, even by making the inner diameter of the inner peripheral face 6 on the mouth 2 larger than the inner diameter of the inner peripheral face 7 on the body 3 of the step surface 5, it is possible to ensure a strength of the mouth 2 by ensuring a thick wall of the mouth 2 is linked to the neck support 4.

The preform 1 is formed into a container having a predetermined shape by liquid-blow molding using the liquid-blow molding apparatus 10, shown in FIG. 3, for example. A construction of the liquid-blow molding apparatus 10 will now be described.

The liquid-blow molding apparatus 10 includes a mold 11 for blow molding. Only a portion of the mold 11 is shown in FIG. 3. However, a cavity 12 of the mold 11 has a bottle shape and is open toward a top at a top face of the mold 11. Although the details are not shown in the drawing, the mold 11 can open to the left and right, allowing the product to be removed after formation from the mold 11 by the mouth of the mold 11.

The preform 1 can be mounted in the mold 11. FIG. 3 shows a state in which the preform 1 depicted in FIG. 1 is mounted in the mold 11. In such a case, the preform 1 is mounted in the mold 11 in an upright position with the mouth 2 at the top side; the mouth 2 projecting upward from the cavity 12.

A nozzle unit 13 is disposed at the top side of the mold 11 to be able freely to move in up and down directions with regard to the mold 11. The nozzle unit 13 includes a body block 14.

A nozzle 17 is disposed in the nozzle unit 13. A nozzle body 17a is formed as a cylinder with a diameter smaller than the inner diameter of the mouth 2 of the preform 1. A large diameter sandwiching portion 17b is integrally formed with the nozzle body 17a and both are constituted by being integrally formed using steel or a resin material or the like, for the nozzle 17. The sandwiching portion 17b is fastened to the body block 14 at an inner face of the body block 14.

The nozzle body 17a is arranged on the same axis as the cavity 12 in the mold 11. When the nozzle unit 13 lowers to a predetermined position, the nozzle body 17a is inserted into the mouth 2 in the preform 1 mounted to the mold 11.

A supply path 18, that extends in the up and down directions, is disposed inside the body block 14; a bottom end of the supply path 18 is connected to the nozzle 17.

Also, a pressurized liquid-supply unit 19 is connected to the supply path 18 via a pipe P. The pressurized liquid-supply unit 19 supplies liquid compressed to a predetermined pressure to the nozzle 17 via the pipe P and supply path 18.

It is preferable to use a construction that uses a plunger pump as a pressurizing source, as the pressurized liquid-supply unit 19, but another constructions may also be used as long as it is able to supply a liquid pressurized to the predetermined pressure to the nozzle 17.

An opening body 20 is arranged inside the supply path 18 to open and close the nozzle 17.

The opening body 20 is formed as a cylindrical rod shape that extends along a shaft center of the supply path 18, and moves in the up and down directions inside the supply path 18. Conversely, a top face of the sandwiching portion 17b of the nozzle 17 is a tapered blocking face 17c. When a tapered face 20a disposed at a leading end of the opening body 20 touches the blocking face 17c by the opening body 20 moving to an end of a bottom stroke, the communication with the supply path 18 and the nozzle body 17a is blocked by the opening body 20 thereby blocking the nozzle 17.

Specifically, by the nozzle body 17a being inserted into the mouth 2 of the preform 1, and the nozzle 17 being opened by the opening body 20 when the pressurized liquid-supply unit 19 is in an activated state, pressurized liquid is supplied into the preform 1 from the pressurized liquid-supply unit 19 passing through the nozzle 17, thereby implementing the liquid-blow molding process.

An extension rod 22 is slidably mounted to an inside of the opening body 20. The extension rod 22 moves relative to the opening body 20 in the up and down directions (axial direction). By moving the extension rod 22 downward relative to the opening body 20, it is possible to stretch the body 3 of the preform 1 mounted to the mold 11 in the vertical direction (axial direction) inside the cavity 12. In other words, before supplying pressurized liquid inside the preform 1, the liquid-blow molding apparatus 10 stretches the preform 1 in the vertical direction using the extension rod 22, then implements biaxial stretch-blow molding of the preform 1 by supplying pressurized liquid inside the preform 1.

Also, the liquid-blow molding apparatus 10 can be constructed without disposing the extension rod 22.

A claw 14a is disposed at a bottom end of the body block 14. When the nozzle body 17a is inserted into the mouth 2 of the preform 1 by lowering the nozzle unit 13 to a predetermined position, the neck support 4 is sandwiched between the claw 14a and a top face of the mold 11, fastening the preform 1 to the mold 11.

A sealing member 24 is mounted to the nozzle 17 to prevent the liquid from leaking between the outer peripheral face of the nozzle body 17a and the inner peripheral face of the mouth 2 when implementing the liquid-blow molding process. The sealing member 24 includes a sealing boy 24a having a shape that is integrated to the cylindrical shape of the nozzle body 17a using an elastic body such as rubber or a similar material, and includes a sandwiching unit 24b integrated to the sandwiching portion 17a that has a larger diameter than the sealing body 24a. The sealing member 24 is fastened to the nozzle 17 with the sealing body 24a fitted to the outer peripheral face of the nozzle body 17a, and the sandwiching unit 24b touching the sandwiching portion 17b of the nozzle 17.

The position of the leading end (a bottom end) of the sealing body 24a of the sealing member 24 substantially matches the position of the leading end (bottom end position) of the nozzle body 17a of the nozzle 17, in the axial direction. With this, substantially the entire outer peripheral face of the nozzle body 17a is covered by the sealing body 24a. Also, the sealing body 24a fits with liquid tightness to the outer peripheral face of the nozzle body 17a. Liquid is unable to invade between the outer peripheral face of the nozzle body 17a and the inner circumference face of the nozzle body 24a.

Also, the outer diameter of the sealing body 24a is smaller than the inner diameter of the inner peripheral face 6 of the preform 1 between the step surface 5 and open end of the mouth 2. Therefore, after the preform 1 is mounted to the mold 11, it is possible easily to insert the nozzle body 17a and the sealing body 24a into the mouth 2 of the preform 1 without sliding the outer peripheral face of the sealing body 24a of the sealing member 24 on the inner peripheral face 6 of the preform 1, by moving the nozzle unit 13 downward.

When the nozzle 17 is inserted into the mouth 2 in the preform 1, the end face of the sealing body 24a of the sealing member 24 in the axial direction touches the step surface 5 of the preform 1 from the axial direction with a predetermined pressure, to impart a liquid-tight seal between the inner peripheral face of the preform 1 and the outer peripheral face of the nozzle body 17a with the sealing member 24. At that time, liquid is prevented from invading between the outer peripheral face of the nozzle body 17a and the inner peripheral face of the sealing body 24a by the sealing body 24a fitting with liquid tightness to the outer peripheral face of the nozzle body 17a. For that reason, when pressurized liquid is supplied inside the preform 1 from the pressurized liquid-supply unit 19 via the nozzle 17, it is supplied toward the inside of the body 3 of the preform 1 without the liquid adhering to the outer peripheral face of the nozzle body 17a and the inner peripheral face of the sealing body 24a.

In this way, it is possible to seal between the nozzle body 17a of the nozzle 17, and the preform 1 at the mouth 2 by touching the bottom end face of the sealing member 24 to the step surface 5 from the axial direction. For that reason, it is possible to prevent liquid from adhering to outer peripheral face of the nozzle body 17a inserted into the mouth 2, and the outer peripheral face of the sealing body 24a. Therefore, it is possible to prevent liquid from dripping from the nozzle 17 when removing the product from the mold 11, and adhering, when the nozzle body 17a is separated from the mouth 2 after the liquid-blow molding process.

Also, the nozzle body 17a and inner peripheral face 6 of the preform 1 is sealed inside the mouth 2 by touching the bottom end face of the sealing member 24 to the step surface 5 from the axial direction, so it is easy to insert the nozzle body 17a and the sealing body 24a inside the mouth 2 of the preform 1 by making the outer diameter of the sealing body 24a smaller than the inner diameter of the inner peripheral face 6 of the preform 1 and to prevent the invasion of liquid between the sealing body 24a and the inner peripheral face 6 of the mouth 2 in the preform 1.

Also, the outer peripheral face of the nozzle body 17a of the nozzle 17, and the inner peripheral face 6 of the mouth 2 are sealed by the sealing member 24 at the inside of the neck support 4, so no liquid pressure is applied to the inner peripheral face 6 of the mouth 2 when liquid id supplied inside the preform 1. Therefore, an outside air-supply mechanism is unnecessary, that prevents diameter expansion of the mouth 2 when supplying liquid to the inside of the preform 1 by supplying compressed air to a space compartmentally formed at the outer peripheral side of the mouth, thereby simplifying the construction of this liquid-blow molding apparatus 10.

The present invention is not limited to the embodiment described above. Various changes may be implemented to a degree that does not deviate from the spirit of the invention.

For example, with the embodiment described above, the liquid-blow molding apparatus 10 is configured to implement liquid-blow molding on the preform 1 depicted in FIG. 1, but it is not limited to that configuration. It is also acceptable to have a construction that liquid-blow molds the preform 1 with the step surface 5 shifted in the axial direction with regard to the neck support 4, as long as it is a preform 1 disposed with the step surface 5 that is touched by the sealing member 24.

The invention claimed is:

1. A liquid-blow molding apparatus for liquid-blow forming a resin-made preform in a container having a predetermined shape, the apparatus comprising:
a nozzle having a cylindrical portion configured to be inserted into a mouth of the preform;
a pressurized liquid-supply unit coupled to the nozzle and configured to supply pressurized liquid to the nozzle inserted into the mouth; and
a sealing member provided at a location on an outer peripheral face of the cylindrical portion so as to be inserted into the mouth of the preform with the cylindrical portion, the sealing member including a leading end face configured to seal the nozzle and an inner peripheral face of the preform by contacting from an axial direction a step surface disposed on the inner peripheral face of the preform when the nozzle is inserted into the mouth of the preform.

2. The liquid-blow molding apparatus according to claim 1, wherein an inner diameter of the preform between the step surface and an open end of the mouth of the preform is greater than an outer diameter of the sealing member to be inserted into the open end of the mouth of the preform.

3. The liquid-blow molding apparatus according to claim 1 wherein a leading end face of the nozzle and a leading end face of the sealing member terminate at a substantially common position in the axial direction.

4. A resin-made preform configured to be formed into a container of a predetermined shape by a liquid-blow molding apparatus having a nozzle and sealing member, the preform comprising:
a closed-end, cylindrical body defining a central axis and connected to a cylindrical portion parallel to the central axis, the cylindrical portion defining a mouth further defining an open end of the preform; and
a flange-shaped neck-support disposed along the cylindrical portion between the mouth and the body, the neck-support projecting radially outward from an outside diameter of the preform and
a step surface provided on an inner peripheral face of the cylindrical portion.

5. The preform according to claim 4, wherein the step surface is a flat circular surface substantially perpendicular to the central axis defined longitudinally through the preform.

6. The preform according to claim 4, wherein an outer diameter of the cylindrical portion adjacent to the neck-support is larger than an outer diameter of the body adjacent to the neck-support.

7. The preform according to claim 4, wherein the inner diameter of mouth adjacent to the step is larger than the inner diameter of the body adjacent to the step.

8. The preform according to claim 4, wherein the step surface is not perpendicular to a central axis defined longitudinally through the preform.

9. The preform according to claim 4, wherein the step surface is angled relative to a central axis defined longitudinally through the preform.

10. The preform according to claim 4, wherein the step surface is circular.

11. The preform according to claim 4, wherein the step surface is conical.

12. The preform according to claim 4, wherein the step surface is located adjacent to the neck support.

13. The preform according to claim 4, wherein the step surface is located immediately radially inward of the neck-support.

14. In combination, a preform and a liquid-blow molding apparatus for forming the preform into a container having a predetermined shape, the combination comprising:
a preform including a closed-end, cylindrical body defining a central axis, the body being connected to a cylindrical portion parallel to the central axis and having a mouth defining an open end of the preform, a flange-shaped neck-support disposed on the cylindrical portion between the mouth and the body, the neck-support projecting radially outward from an outside diameter of the preform, and a step surface provided on an inner peripheral face of the cylindrical portion; and
a liquid-low molding apparatus including a nozzle having a cylindrical nozzle portion configured to be inserted into the mouth of the preform, a pressurized liquid-supply unit coupled to the nozzle and configured to supply a pressurized liquid to the nozzle, a sealing member provided at a location on an outer peripheral face of the cylindrical nozzle portion so as to be inserted into the preform with the cylindrical nozzle portion, the sealing member being configured to seal the nozzle and an inner peripheral face of the preform, the sealing member having an axial end face configured to contact the step surface from an axial direction when the nozzle is inserted into the mouth of the preform.

15. The combination of claim 14, wherein the outer surface of the sealing member is cylindrical.

16. The combination of claim 14, wherein an inner diameter of the preform between the step surface and the mouth of the preform is greater than an outer diameter of the sealing member to be inserted into the open end of the preform.

17. The combination of claim 14, wherein a leading end face of the nozzle and the leading end face of the sealing member terminate at a substantially common position in the axial direction.

18. The combination of claim 14, wherein the step surface is a flat circular surface substantially perpendicular to a central axis defined longitudinally through the preform.

19. The combination of claim 14, wherein the step surface is not perpendicular to a central axis defined longitudinally through the preform.

20. The combination of claim 14, wherein the step surface is located immediately radially inward of the neck-support.

* * * * *